United States Patent
König et al.

(10) Patent No.: US 9,958,356 B2
(45) Date of Patent: May 1, 2018

(54) PROCESS AND DEVICE FOR TESTING THE POWERTRAIN OF AT LEAST PARTIALLY ELECTRICALLY DRIVEN VEHICLES

(71) Applicant: AVL LIST GMBH, Graz (AT)

(72) Inventors: Oliver König, Graz (AT); Stefan Jakubek, Vienna (AT); Günter Prochart, Graz (AT); Kurt Gschweitl, Eggersdorf (AT); Gregor Gregorcic, Graz (AT)

(73) Assignee: AVL LIST GmbH, Graz (AT)

( * ) Notice: Subject to any disclaimer, the term of this patent is extended or adjusted under 35 U.S.C. 154(b) by 484 days.

(21) Appl. No.: 14/402,815

(22) PCT Filed: May 24, 2013

(86) PCT No.: PCT/EP2013/060716
§ 371 (c)(1),
(2) Date: Nov. 21, 2014

(87) PCT Pub. No.: WO2013/174967
PCT Pub. Date: Nov. 28, 2013

(65) Prior Publication Data
US 2015/0143885 A1 May 28, 2015

(30) Foreign Application Priority Data
May 24, 2012 (AT) .................. A 610/2012

(51) Int. Cl.
*G01M 13/02* (2006.01)
*G01M 15/00* (2006.01)
*G05B 13/04* (2006.01)
*G01M 15/02* (2006.01)

(52) U.S. Cl.
CPC ............ *G01M 13/02* (2013.01); *G01M 15/00* (2013.01); *G01M 15/02* (2013.01); *G05B 13/048* (2013.01)

(58) Field of Classification Search
CPC ....... G01M 15/00; G01M 15/02; G01M 13/02
USPC ......................................... 73/115.01, 118.01
See application file for complete search history.

(56) References Cited

FOREIGN PATENT DOCUMENTS

| AT | 11373 | 9/2010 |
|---|---|---|
| DE | 102009034555 | 1/2011 |
| JP | 2010266439 | 11/2010 |

OTHER PUBLICATIONS

O. Konig et al., "Model Predictive Control of a Battery Emulator for Testing of Hybrid and Electric Powertrains," 2011 IEEE Vehicle Power and Propulsion Conference (VPPC 2011), Chicago, IL., Sep. 6-9, 2011, pp. 1-6.
English Abstract of DE102009034555.
English Abstract of AT11373.
English Abstract of JP 2010266439.
(Continued)

*Primary Examiner* — Peter Macchiarolo
*Assistant Examiner* — Anthony W Megna Fuentes
(74) *Attorney, Agent, or Firm* — Whitmyer IP Group LLC

(57) ABSTRACT

In a process for testing the powertrain of vehicles that are at least in part electrically driven, the voltage supplied to the powertrain is controlled by a controller coupled with a simulation system for the energy storage system in a way that the voltage acts dynamically as for a real energy storage system. The controller is designed with a model based controller design method, with a load model of the powertrain being used in the model of the controlled system.

9 Claims, 12 Drawing Sheets

(56) References Cited

OTHER PUBLICATIONS

A. Emadi et al., "Constant Power Loads and Negative Impedance . . . Motor Drives" in IEEE Transactions on Vehicular Technology, vol. 55, No. 4, Jul. 2006, pp. 1112-1125.
H. Bae et al., "Digital Resistive Current (DRC) Control for the Parallel Interleaved DC-DC Converters," IEEE Transactions on Power Electronics, vol. 23, No. 5, Sep. 2008, pp. 2465-2476.
A. Bemporad et al., "Model Predictive Control Based on Linear Programming—The Explicit Solution," IEEE Transactions on Automatic Control, vol. 47, No. 12, Dec. 2002, pp. 1974-1985.
J. Bonilla et al., "Fast NMPC of a DC-DC Converter: An Exact Newton Real-Time Iteration Approach," $7^{th}$ IFAC Symposium on Nonlinear Control Systems, Aug. 21-24, 2007 (Pretoria, SA), pp. 194-199.
P.H. Chou et al., "B#: A Battery Emulator and Power Profiling Instrument," ISLPED '03: Proceedings of the 2003 international symposium on low power electronics and design, New York: ACM, 2003, pp. 288-293.
J.G. Ciezki et al., "The Application of Feedback Linearization Techniques to the Stabilization of DC-to-DC Converters with Constant Power Loads," IEEE, vol. 3, 1998, pp. 526-529.
M.C. Di Piazza et al., "Photovoltaic Field Emulation Including Dynamic and Partial Shadow Conditions," Applied Energy, vol. 87, No. 3 (2010), pp. 814-823.
A. Emadi et al., "Negative Impedance Stabilizing Controls for PWM DC/DC Converters Using Feedback Linearization Techniques," IECEC, vol. 1, 2000, pp. 613-620.
H.J. Ferreau et al., "An Online Active Set Strategy to Overcome the Limitations of Explicit MPC," Int. J. Robust Nonlinear Control, vol. 18, No. 8, 2008, pp. 816-830.
A. Gebregergis et al., "The Development of Solid Oxide Fuel Cell (SOFC) Emulator," PESC 2007, IEEE, 17-21 2007, pp. 1232-1238.
T. Geyer et al., "On the Optimal Control of Switch-Mode DC-DC Converters," HSCC 2004, pp. 342-356.
T. Geyer et al., "Constrained Optimal Control of the Step-Down DC-DC Converter," IEEE Transactions on Power Electronics, vol. 23, No. 5, Sep. 2008, pp. 2454-2464.
T. Baumhöfer et al., Specialized Battery Emulator for Automotive Electrical Systems, VPPC, Sep. 2010, pp. 1-4.
B. Choi et al., "Dynamics and Control of DC-to-DC Converters Driving Other Converters Downstream," IEEE Transactions on Circuits and Systems—I: Fundamental Theory and Applications, vol. 46, No. 10, Oct. 1999, pp. 1240-1248.
K. Zhang et al., "State-Feedback-with-Integral Control Plus Repetitive Control for UPS Inverters," Twentieth Annual IEEE Applied Powers Electronics Conference and Exposition, 2005, No. 2, pp. 553-559.
R.W. Erickson and D. Maksimovic, *Fundamentals of Power Electronics*, Springer, 2001, pp. 228-241.
J. Maciejowski, *Predictive Control and Constraints*, Pearson Education, 2002, pp. 2-7, 25-26, 88-97.
G. Gregorčič et al., "Nonlinear Model-Based Control of Highly Nonlinear Processes," Computers and Chemical Engineering, No. 34, 2010, pp. 1268-1281.
V. Grigore et al., "Dynamics of a Buck Converter with a Constant Power Load," PESC 98, $29^{th}$ Annual IEEE, vol. 1, 1998, pp. 17-22, 72-78.
O. König et al., "Model Predictive Control of a Battery Emulator for Testing of Hybrid and Electric Powertrains," 2011.
A. Kwasinksi et al., "Passivity-Based Control of Buck Converters with Constant-Power Loads," PESC 2007, IEEE 2007, pp. 259-265.
U. Maeder et al., "Linear Offset-Free Model Predictive Control," Automatica, vol. 45, 2009, pp. 2214-2222.
S. Mariethoz et al., "Model Predictive . . . Power Balance," PESC 20008, IEEE 2008, pp. 1069-1074.
R. Milman et al., "A Fast MPC Algorithm Using Nonfeasible Active Set Methods," J. Optim Theory Appl, vol. 139, 2008, pp. 591-616.
A. M. Rahimi et al., "Active Damping in DC/DC . . . Power Loads," IEEE Transactions on Industrial Electronics, vol. 56, No. 5, May 2009, pp. 1428-1439.
S. Richter et al., "Real-Time Input-Constrained . . . Methods," Joint $48^{th}$ IEEE Conference on Decision and Control and $28^{th}$ Chinese Control Conference, Shanghai China, Dec. 16-18, 2009, pp. 7387-7393.
S. Richter et al., "High-Speed Online . . . Control," 2010 American Control Conference, Marriott Waterfront, Balt., MD, Jun. 30-Jul. 2, 2010, pp. 4737-4743.
Y. Wang et al., "Fast Model Predictive . . . Optimization," IEEE Transactions on Control Systems Technology, vol. 18, No. 2, Mar. 2010, pp. 267-278.
A. Wills et al., "Application of MPC to an Active Structure Using Sampling Rates Up to 25kHz," Proc. $44^{th}$ IEEE Conference on Decision and Control, and the European Control Conference 2005, Seville, Spain, Dec. 12-15, 2005, pp. 3176-3181.
Y. Xie et al., "Implicit Model Predictive Control . . . Converter," IEEE Transactions on Power Electronics, vol. 24, No. 12, Dec. 2009, pp. 2704-2713.
M. Zima et al., "Model Predictive Control . . . Applications," Proc. $44^{th}$ IEEE Conference Decision and Control, and the European Control Conference 2005, Seville, Spain, Dec. 12-15, 2005, pp. 4452-4456.

(a) Small step change from 50V to 150V (b) Large step change from 50V to 550V (a) Scheduling controller (b) Robust Controller (a) Scheduling controller (b) Robust controller

PROCESS AND DEVICE FOR TESTING THE POWERTRAIN OF AT LEAST PARTIALLY ELECTRICALLY DRIVEN VEHICLES

TECHNICAL FIELD

The invention is referring to a process for testing the powertrain of vehicles that are at least in part electrically driven, whereby the voltage supplied to the powertrain is controlled by a controller coupled with a simulation system for the energy storage system in a way that the voltage acts dynamically as for a real energy storage system, and a device for working said process.

BACKGROUND

The development of hybrid (HEV) and electric vehicles (EV) is a complex task that involves many new technologies that have not been used previously in the automotive industry. Mastering this task requires early testing of individual components in order to timely detect problems and to ensure seamless integration. However, components interact with each other such that isolated testing is impossible without a proper test bed that can emulate these interactions. For each component, an individual environment that matches its future operating conditions as closely as possible is required. A powertrain that contains one or more electric motors does not only require a mechanical but also an electrical testing environment. An important part of the electrical environment is the traction battery. Testing with a real battery requires time consuming pre-conditioning of the battery in order to achieve defined operating conditions for the powertrain. In addition, battery aging prevents deterministic repetition of test runs. Even more, it is often desirable to test the powertrain as early as possible when a suitable battery may not even be available yet. These challenges can be met by using a battery emulator (BE) that acts as a substitute for the traction battery by emulating its electrical characteristics. These are usually simulated using a more or less complex battery model. A programmable DC power supply replicates the simulated battery voltage at its output terminals and supplies the powertrain with the necessary power. The measured load current is fed back to the simulation model in order to update the state of the virtual battery. Because of the power levels of several tens or even hundreds of kilowatts, a switch-mode DC-DC converter has to be used instead of a linear power supply. The time constants of the electrochemical processes inside the battery are usually slow compared to that of the power electronics and the electric powertrain. Neverthe-less, because of capacitances due to double layer effects and ohmic resistance and inductance of interconnections between the cells, the terminal voltage can change very fast due to load current transients. E.g. a step increase in the load current will cause an immediate drop of the terminal voltage. It is not sufficient to just replicate the open circuit voltage from the battery model, the internal impedance of the battery must be emulated. As a consequence, it is necessary to design a controller that achieves fast output voltage reference tracking and effective load current rejection such that the output impedance of the battery emulator's output converter is suppressed and the impedance from the battery model can be imposed. Increasing demand for emulation of ultracapacitor batteries further increases the required bandwidth, because they exhibit faster dynamics than electrochemical batteries.

During operation, the traction inverter controls the speed or torque produced by the electric traction motor. Changes in the battery terminal voltage are compensated for by the controller such that the inverter's power output does not change. In the literature, such a load is usually called a constant power load (CPL). When a CPL is supplied by a power electronic converter instead of a battery, the system can become unstable due to the load's negative impedance characteristic. This is particularly problematic with compact, high performance automotive inverters. Compared to inverters for industrial applications, traction inverters usually have a small DC-link capacitor, which reduces the stability margin. As a further consequence of the resulting small filter capacitance, load transients and current ripple are propagated back to the DC-supply.

Power supply emulation has many fields of application. The emulation of batteries is also helpful for testing of consumer electronic devices, such as described in [P. H. Chou, C. Park, J. Park, K. Pham, and J. Liu, "B#: a battery emulator and power profiling instrument," in *ISLPED '03: Proceedings of the* 2003 *international symposium on Low power electronics and design*. New York, N.Y., USA: ACM, 2003, pp. 288-293]. Testing of fuel cell power converters can be problematic due to the limited availability of fuel cell prototypes and the risk of expensive damage. Therefore, the emulation of fuel cells can be of advantage [A. Gebregergis and P. Pillay, "The development of solid oxide fuel cell (sofc) emulator," in *Power Electronics Specialists Conference,* 2007. *PESC* 2007. *IEEE,* 17-21 2007, pp. 1232-1238]. In both documents, a linear power amplifier is used in order to interface the model of the power source to the system under test. Although such amplifiers can provide high bandwidths, they are limited to small power levels due to their low efficiency. Another important field of application is the testing of grid inverters for photovoltaic systems. In [M. C. Di Piazza and G. Vitale, "Photovoltaic field emulation including dynamic and partial shadow conditions," *Applied Energy,* vol. 87, no. 3, pp. 814-823, 2010], a photovoltaic panel emulator based on a switch mode DC-DC converter is described. A description of an emulator for automotive starter batteries can be found in [T. Baumhöfer, W. Waag, and D. Sauer, "Specialized battery emulator for automotive electrical systems," in *Vehicle Power and Propulsion Conference (VPPC),* 2010 *IEEE,* September 2010, pp. 1-4].

DC-DC converters connected to CPLs are studied in several publications. The concept of negative impedance instability was introduced by [V. Grigore, J. Hatonen, J. Kyyra, and T. Suntio, "Dynamics of a buck converter with a constant power load," in *Power Electronics Specialists Conference,* 1998. *PESC* 98 *Record.* 29*th Annual IEEE,* vol. 1, 17-22 1998, pp. 72-78 vol. 1] and [B. Choi, B. Cho, and S. S. Hong, "Dynamics and control of dc-to-dc converters driving other converters downstream," *Circuits and Systems* 1: *Fundamental Theory and Applications, IEEE Transactions on,* vol. 46, no. 10, pp. 1240-1248, October 1999]. The proposed stabilizing control approaches range from feedback linearization in [J. Ciezki and R. Ashton, "The application of feedback linearization techniques to the stabilization of dc-to-dc converters with constant power loads," in *Circuits and Systems,* 1998. *ISCAS '*98. *Proceedings of the* 1998 *IEEE International Symposium on,* vol. 3, May-3, Jun. 1998, pp. 526-529 vol. 3] and [A. Emadi and M. Ehsani, "Negative impedance stabilizing controls for pwm dc-dc converters using feedback linearization techniques," in *Energy Conversion Engineering Conference and Exhibit,* 2000. (*IECEC*) 35*th Intersociety,* vol. 1, 2000, pp. 613-620 vol. 1] over sliding mode control in [A. Emadi, A. Khaligh, C. Rivetta, and G. Williamson, "Constant power loads and negative impedance instability in automotive systems: definition, modeling, stability, and control of power electronic converters and motor drives," *Vehicular Technology, IEEE Transactions on*, vol. 55, no. 4, pp. 1112-1125, July 2006] to passivity based PID design in [A. Kwasinski and P. Krein, "Passivity-based control of buck converters with constant-power loads," in *Power Electronics Specialists Conference, 2007. PESC 2007. IEEE*, 2007, pp. 259-265] and active damping in [A. Rahimi and A. Emadi, "Active damping in dc/dc power electronic converters: A novel method to overcome the problems of constant power loads," *Industrial Electronics, IEEE Transactions on*, vol. 56, no. 5, pp. 1428-1439, May 2009]. Model predictive control for stabilization of power systems containing CPLs is proposed in [M. Zima and G. Andersson, "Model predictive control employing trajectory sensitivities for power systems applications," in *Decision and Control, 2005 and 2005 European Control Conference. CDC-ECC '05. 44th IEEE Conference on*, 2005, pp. 4452-4456]. All of these have in common that a supply converter has to provide a constant voltage for one or more load converters that act as constant power loads. The proposed control design approaches lead to stable closed loops but the reference step responses (if considered at all) are slow and exhibit underdamped oscillations. In contrast, the application that is presented here requires fast voltage reference tracking.

Other power electronic converters that require fast reference tracking are uninterruptible power supplies (UPS) that generate an AC voltage. The periodic nature of the AC voltage can be exploited in order to improve reference tracking and disturbance rejection [K. Zhang, L. Peng, Y. Kang, and J. Xiong, "State-feedback-with-integral control plus repetitive control for UPS inverters," in *Twentieth Annual IEEE Applied Power Electronics Conference and Exposition, 2005. APEC 2005.*, no. 2. IEEE, 2005, pp. 553-559]. For a BE, the output voltage is not periodic and depends on the load current via the battery model so that these approaches cannot be applied here.

Due to the increasing computational power of digital controller platforms and improved algorithms, model predictive control (MPC) is not restricted to systems with slow dynamics any more. It can now also be applied to systems that require high sampling rates such as power electronic converters. The control of DC-DC converters with MPC is proposed by [T. Geyer, G. Papafotiou, and M. Morari, "On the optimal control of switch-mode dc-dc converters," *Hybrid Systems: Computation and Control*, pp. 77-85, 2004] and experimental results are shown in [T. Geyer, G. Papafotiou, R. Frasca, and M. Morari, "Constrained optimal control of the step-down dc-dc converter," *Power Electronics, IEEE Transactions on*, vol. 23, no. 5, pp. 2454-2464, September 2008], where the so-called explicit MPC (eMPC) [A. Bemporad, F. Borrelli, and M. Morari, "Model predictive control based on linear programming the explicit solution," *Automatic Control, IEEE Transactions on*, vol. 47, no. 12, pp. 1974-1985, December 2002] was the key for computational feasibility. In [A. Wills, D. Bates, A. Fleming, B. Ninness, and R. Moheimani, "Application of mpc to an active structure using sampling rates up to 25 khz," in *Decision and Control, 2005 and 2005 European Control Conference. CDC-ECC '05. 44th IEEE Conference on*, 2005, pp. 3176-3181], experimental results for active vibration control using MPC with constraints at sampling rates from 5 kHz to 25 kHz are presented. Experimental results for nonlinear MPC of an isolated full-bridge converter with a sampling time of 150 μs are shown in [Y. Xie, R. Ghaemi, J. Sun, and J. Freudenberg, "Implicit model predictive control of a full bridge dc-dc converter," *Power Electronics, IEEE Transactions on*, vol. 24, no. 12, pp. 2704-2713, 2009]. Nonlinear MPC of a boost converter is described in [J. Bonilla, R. De Keyser, M. Diehl, and J. ESPINOZA, "Fast NMPC of a DC-DC converter: an exact Newton real-time iteration approach," in *Proc. of the 7th IFAC Symposium on Nonlinear Control Systems (NOL-COS 2007)*, 2007], but no experimental results are given. The simulated online linear MPC of a three-phase grid inverter that is described in [S. Richter, S. Mariethoz, and M. Morari, "High-speed online mpc based on a fast gradient method applied to power converter control," in *American Control Conference (ACC), 2010*, 302010-Jul. 2, 2010, pp. 4737-4743] is shown to be executable in 10 μs . . . 50 μs on a standard DSP, but no experimental results are presented. The algorithm that is used in said last document is based on the fast gradient method proposed posed in [S. Richter, C. Jones, and M. Morari, "Real-time input-constrained mpc using fast gradient methods," in *Decision and Control, 2009 held jointly with the 2009 28th Chinese Control Conference. CDC/CCC 2009. Proceedings of the 48th IEEE Conference on*, 2009, pp. 7387-7393].

Fast QP solvers tailored for MPC are proposed in [R. Milman and E. Davison, "A fast mpc algorithm using nonfeasible active set methods," *Journal of Optimization Theory and Applications*, vol. 139, pp. 591-616, 2008, 10.1007/s10957-008-9413-3], [H. J. Ferreau, H. G. Bock, and M. Diehl, "An online active set strategy to overcome the limitations of explicit mpc," *Int. J. Robust Nonlinear Control*, vol. 18, no. 8, pp. 816-830, 2008] and [Y. Wang and S. Boyd, "Fast model predictive control using online optimization," *Control Systems Technology, IEEE Transactions on*, vol. 18, no. 2, pp. 267-278, 2010].

Usually, controllers for DC-DC converters are designed for a nominal load, which in many cases is a resistor. Utilizing model based controller design it is possible to design a controller for a converter with an arbitrary load, as long as a suitable model is available. As a consequence, there is no need to rely on a nominal load resistor for control design. In this paper, we propose a converter model suitable for MPC design including a CPL with an additional input filter capacitance. The model is based on a linearized negative impedance approximation of the CPL which depends on the output voltage and the power demand of the load. Two different approaches for linear MPC design are proposed that can account for changes in the operating point. The first approach is a simple robust MPC design with two internal models that represent extremal values of the approximated load impedance. The second approach is a scheduling controller design that uses a set of different controller parameters for a number of operating points across the expected operating range. Based on an estimate of the load power demand, the closest parameter set is chosen for the calculation of the next control move at every sampling step. An observer is used in order to achieve offset free tracking despite unmeasured disturbances, filtering of measured disturbances and estimation of the load power demand.

For the implementation of constrained MPC, a heuristic active set method is proposed to quickly find a good active set within the limited time available for computation. This method and the robust MPC approach are also presented in [O. König, S. Jakubek, and G. Prochart, "Model predictive control of a battery emulator for testing of hybrid and electric power-trains," 2011, accepted for presentation at: 2011 IEEE Vehicle Power and Propulsion Conference (VPPC)], however without constraints on the inductor current.

An approach to online model predictive control (MPC) of a high power step-down dc-dc converter is proposed. The converter is part of a battery emulator as a replacement for traction batteries on test beds for hybrid or fully electric automotive powertrains. This application requires fast tracking of a reference voltage from a simulated battery model, while being insensitive to fast load transients. The combination of the converter's weakly damped output filter with a tightly regulated load inverter that acts as a constant power load results in an unstable system. The exact specifications of the load are not known at the stage of control design and the power demand is fluctuating. Input constraint handling and inductor current limiting are required for optimal performance and for hardware protection. The proposed MPC based on an active set method achieves fast reference tracking despite the constant power load while respecting input and state constraints. The control algorithm can be executed at the required sampling rate on readily available digital controller hardware. Experimental results for a 60 kW battery emulator feeding an inverter demonstrate the performance of the proposed control approach.

SUMMARY

According to the present invention the controller is designed with a model based controller design method, with a load model of the powertrain being used in the model of the controlled system.

A preferred embodiment is characterized in that the output voltage is measured, the power demand of the powertrain is estimated and the parameters of the load model are modified in dependence of the output voltage and the estimated load demand, preferably by switching between complete sets of parameters.

Optionally, the estimation of the load power demand is accomplished with an observer system, based on the measured load current.

According to the present invention a device for testing of a powertrain of vehicles that are at least in part electrically driven, with a simulation system for the energy storage system, and with a controller for controlling the voltage supplied to the powertrain in a manner that said voltage acts dynamically as for a real storage system, said controller being coupled with the simulation system, is characterized in that in the controller a model predictive control loop is established and in that a load model is integrated in the controlled system.

A preferred embodiment of said device is characterized in that a load power demand dependent model is integrated.

Both mentioned devices can optionally be characterized in that in the controller a model predictive control is established.

A model can be integrated that depends on the output voltage of the energy storage system. The model based predictive control of the battery simulator allows the optimal integration of the load model in the model of the controlled system, such that the load is no longer an unknown disturbance, but is considered explicitly in the controller. The parameters of the load model are dependent of the power demand of the load. If a linearized model is used for the model based predictive controller, the model's parameters additionally depend on the terminal voltage. Therefore, control parameter sets are adapted that are suitable for a scheduling of the model based predictive controller. Switching or blending between the parameter sets is done according to the measured output voltage and the estimated power demand. For this purpose, the power demand is estimated with an observer system and based on the measured load current.

In the following specification the invention shall be further described with reference to the attached drawing figures.

DETAILED DESCRIPTION

Figure 1:
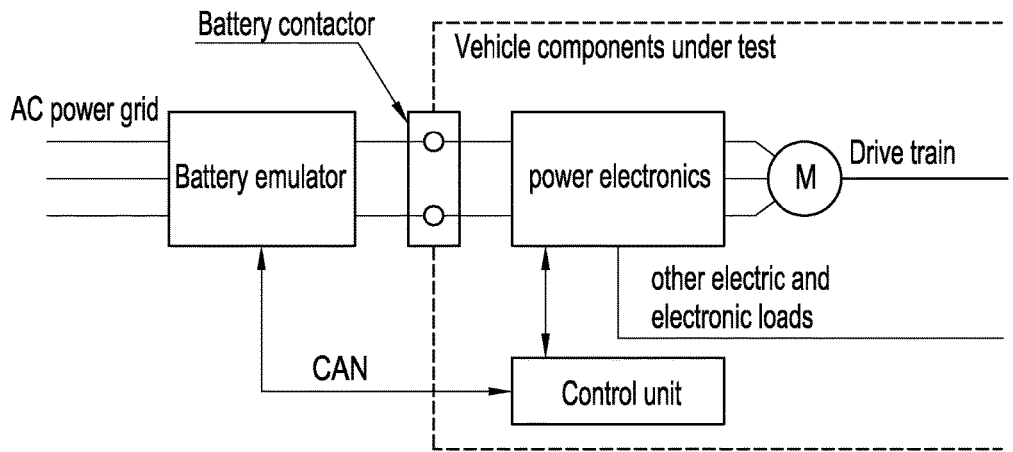
FIG. 1 shows a powertrain testbed with battery emulator in schematic form.

An example of a typical testbed configuration is shown in FIG. 1. The plant consists of the power electronics of an HEV or EV powertrain that represent the load on one hand and the battery emulator that replaces the actual traction battery on the other hand. For controller design, the battery emulator and the load are modeled separately and then combined into one system model.

Figure 2:
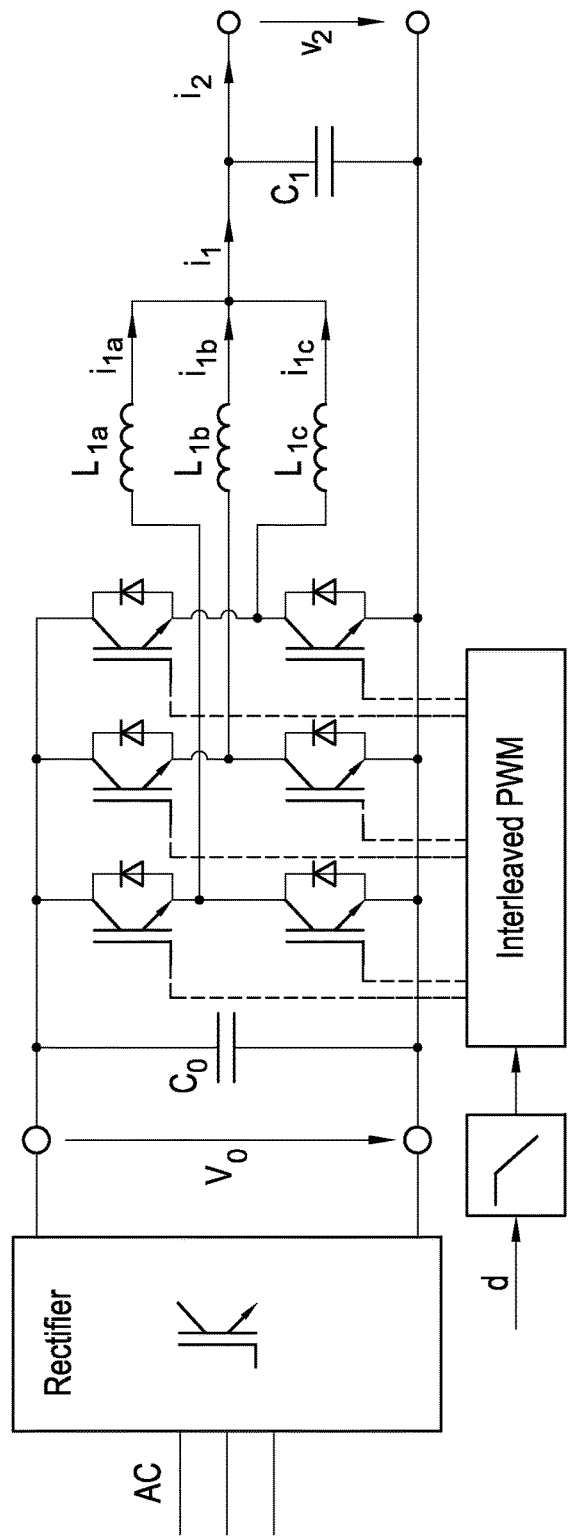
FIG. 2 shows a schematic diagram of the battery emulator output stage.

A schematic diagram of the battery emulator is shown in FIG. 2. The main part is the output stage consisting of three interleaved step-down DC-DC converters with a common output capacitor $C_1$ providing the output voltage $v_2$ that is used to emulate the battery terminal voltage. The rectifier is not considered here and $C_0$ is large enough such that the DC-link voltage $V_0$ can be assumed to be constant.

An analog modulator performs pulse width modulation (PWM) and inductor current balancing from a single duty cycle command d at its input. A simplified model suitable for real-time MPC is obtained by averaged switch modeling [R. W. Erickson and D. Maksimović, *Fundamentals of power electronics*. Springer, 2001] and by paralleling the three inductors to one lumped inductor $L_1$ as in [S. Mariethoz, A. Beccuti, and M. Morari, "Model predictive control of multiphase interleaved dc-dc converters with sensorless current limitation and power balance," in *Power Electronics Spe-* cialists Conference, 2008. PESC 2008. IEEE, 2008, pp. 1069-1074] or [H. Bae, J. Lee, J. Yang, and B. H. Cho, "Digital resistive current (drc) control for the parallel interleaved dc-dc converters," Power Electronics, IEEE Transactions on, vol. 23, no. 5, pp. 2465-2476, 2008]. Then the sum of all three currents $i_1=i_{1a}+i_{1b}+i_{1c}$ is chosen as the new inductor current. Ohmic resistances of inductors and semiconductor switches are approximated by $R_{L1}$. The current drawn by the load is denoted by $i_2$. With the state vector for the converter chosen as $x_c=[i_1\ v_2]^T$, control input $u=d\cdot V_0$ and disturbance input $i_2$, the system is described by $$\dot{x}_c = \underbrace{\begin{bmatrix} -\frac{R_{L1}}{L_1} & -\frac{1}{L_1} \\ \frac{1}{C_1} & 0 \end{bmatrix}}_{A_c} x_c + \underbrace{\begin{bmatrix} \frac{1}{L_1} \\ 0 \end{bmatrix}}_{B_c} u + \underbrace{\begin{bmatrix} 0 \\ -\frac{1}{C_1} \end{bmatrix}}_{E_c} i_2 \quad (1)$$

$$v_2 = \underbrace{[0\ 1]}_{C_c} x_c.$$

The quantities $i_1$, $v_2$ and $i_2$ can be measured.

The HEV/EV electric motor inverter is a tightly regulated voltage source inverter with its DC-link connected to the BE. The inverter's power output P is independent of its supply voltage $v_2$ as long as it is within a specified range. This configuration is modeled as a CPL for which the relation between the current $\tilde{i}_2$ drawn by the CPL and the supply voltage is found as $$\tilde{i}_2 = \frac{P}{v_2}. \quad (2)$$

Equation (2) closes a feedback loop from the output voltage to the load current disturbance input, which leads to the nonlinear state equation $$\dot{x}_c = A_c x_c + E_c f(x_c) + B_c u \quad (3)$$

with $$f(x_c) = \frac{P}{v_2(x_c)}.$$

Introducing the equivalent resistance $R_2$ $$\frac{1}{R_2} = \frac{\partial}{\partial v_2} f(x_c)\Big|_{v_2^0, P} = -\frac{P}{(v_2^0)^2} = -\frac{i_2^0}{v_2^0} \quad (4)$$

at the operating point $v_2^0$ and $i_2^0 = P/v_2^0$, an operating point dependent linearized model of the plant is found as $$\dot{x}_p = \left(A_c + E_c \frac{1}{R_2} C_c\right) x_p + B_c u + E_c\left(i_0^2 - \frac{1}{R_2} v_2^0\right) \quad (5)$$

For $P>0$ and $v_2>0$, $R_2$ is negative, such that the plant becomes unstable.

Figure 3:
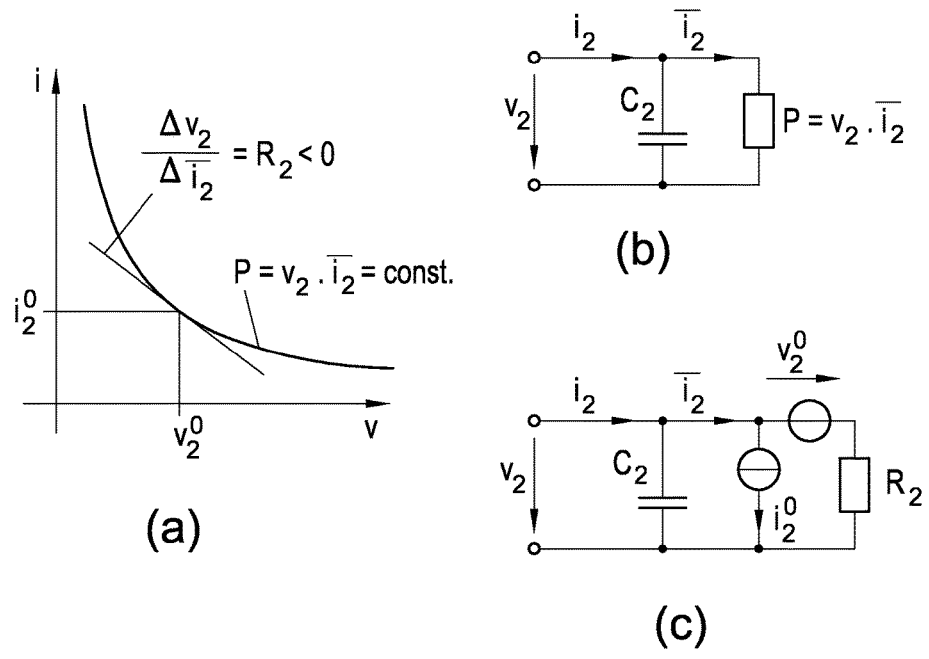
FIG. 3 is an illustration of the load model. (a) Static characteristic of a constant power load. (b) Nonlinear load model. (c) Small signal model linearized around operating point.

FIG. 3 is an illustration of the load model. Item (a) depicts a static characteristic of a constant power load, item (b) a nonlinear load model and item (c) Small signal model linearized around the operating point $v_2^0$, $i_2^0$.

A new output vector $z=[i_1\ v_2\ i_2]^T$ is introduced to represent all measurable quantities. Cable resistances are sufficiently small so that the load inverter's DC-link capacitance $C_2$ can be added in parallel to $C_1$. As a result, one obtains the model in (6). For ease of notation, the symbol $g_P=1/R_2$ will be used as a parameter. The variable $w=i_2^0-v_2^0\cdot g_P$ denotes the operating point offset.

$$\dot{x}_p = \underbrace{\begin{bmatrix} -\frac{R_{L1}}{L_1} & -\frac{1}{L_1} \\ \frac{1}{C_1+C_2} & -\frac{1}{C_1+C_2} g_P \end{bmatrix}}_{A_p(g_P)} x_p + \underbrace{\begin{bmatrix} \frac{1}{L_1} \\ 0 \end{bmatrix}}_{B_p} u + \underbrace{\begin{bmatrix} 0 \\ -\frac{1}{C_1+C_2} \end{bmatrix}}_{E_p} w \quad (6)$$

$$z = \underbrace{\begin{bmatrix} 1 & 0 \\ 0 & 1 \\ 1 - \frac{C_1}{C_1+C_2} & \frac{C_1}{C_1+C_2} g_P \end{bmatrix}}_{C_p(g_P)} x_p + \underbrace{\begin{bmatrix} 0 \\ 0 \\ \frac{C_1}{C_1+C_2} \end{bmatrix}}_{F_p} w$$

Figure 4:
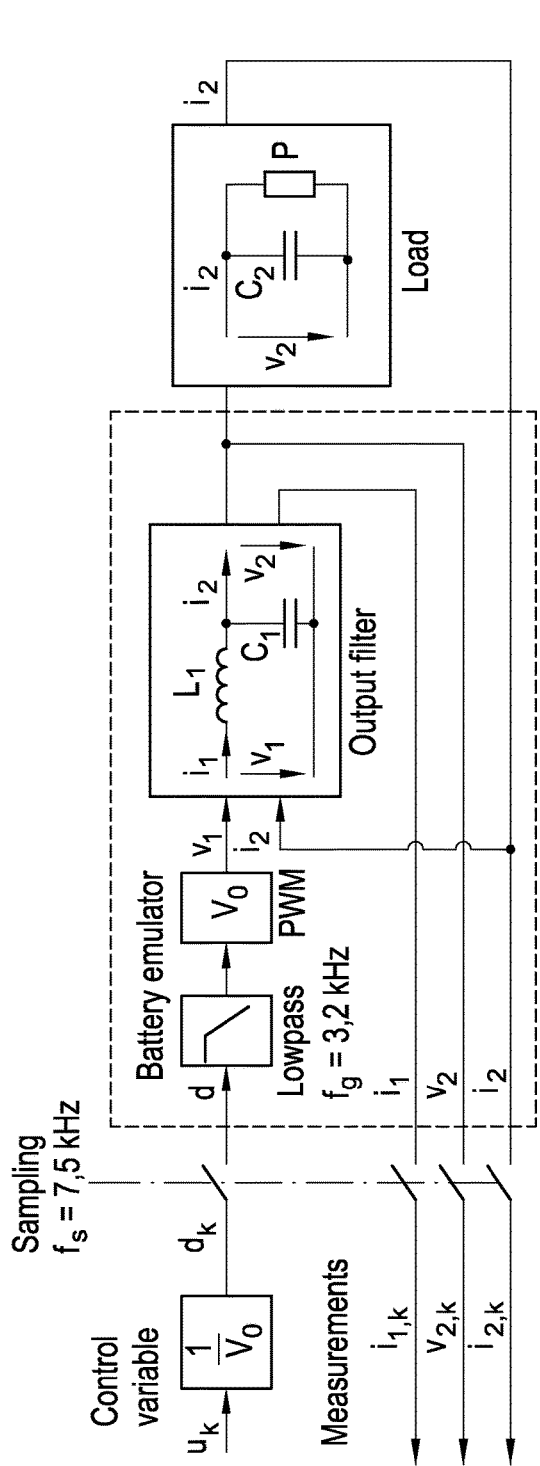
FIG. 4 is a block diagram of the battery emulator model.

FIG. 4 shows a block diagram of the resulting model structure that will be used for control design, including I/O interfaces and sampling for digital control. The sampling is synchronized to the centers of the three interleaved, symmetric PWM carrier signals, such that the sampling rate $f_s$ is three times the switching frequency $f_{sw}$ of each phase. The continuous time system model (6) is converted to a discrete time model (7) using a zero order hold (ZOH) approximation. For compact notation, the operating point offset $w_k$ is added as a new state such that $x_{dk}=[i_{1,k}\ v_{2,k}\ w_k]^T$.

$$x_{dk+1}=A_d(g_P)\cdot x_{dk}+B_d(g_P)\cdot u_k,\ y_k=C_d^T\cdot x_{dk},\ z_k=C_d(g_P)\cdot x_{dk} \quad (7)$$

The control design is preferably chosen to be a model predictive control (MPC). For time on-line MPC formulation according to [J. Maciejowski, Predictive control; with constraints. Pearson education, 2002], an augmented discrete time system description is utilized $$x_{k+1}=Ax_k+B\Delta u_k,\ y_k=Cx_k, \quad (8)$$

with the state vector chosen as $x_k=[x_{dk}^T\ u_{k-1}]^T$. This allows offset free tracking in combination with a state observer according to [U. Maeder, F. Borrelli, and M. Morari, "Linear offset-free model predictive control," Automatica, vol. 45, no. 10, pp. 2214-2222, 2009] and it also contains a computational delay of one sample.

At each time instant k an optimal sequence of control moves $\Delta u_k$ is determined for a control horizon $N_c$ and a prediction horizon $N_p$ such that the following criterion is minimized:

$$J_k=(R_{s,k}-Y_k)^T Q(R_{s,k}-Y_k)+\Delta U_k^T R\Delta U_k \quad (9)$$

The symmetric and positive definite weighting matrices Q and $\overline{R}$ penalize (i) deviations of the predicted output trajectory $Y_k$ from the reference trajectory $R_{s,k}$ and (ii) the control effort $\Delta U_k$, respectively. The decision variable is the sequence of future control moves $$\Delta U_k=[\Delta u_{k|k}\ \ldots\ \Delta u_{k+N_c-1|k}]^T \quad (10)$$

and the output trajectory is the sequence of predicted outputs $$Y_k=[y_{k+1|k}\ \ldots\ y_{k+N_p|k}]^T=Fx_k+\Phi\Delta U_k \quad (11)$$

with the matrices F and Φ defined as:

$$F = \begin{bmatrix} CA \\ \vdots \\ CA^{N_p} \end{bmatrix};\quad (12)$$

$$\Phi = \begin{bmatrix} CB & \cdots & 0 \\ CAB & \cdots & 0 \\ \vdots & \ddots & \vdots \\ CA^{N_p-1}B & \cdots & CA^{N_p-N_c}B \end{bmatrix}$$

The power of MPC lies in the ability to handle constraints explicitly. Thus, the limitation of the PWM duty cycle to $0 \leq d_k \leq 1$ and hence $0 \leq u_k \leq V_0$ is formulated as inequality constraints in the form of $$M_u \Delta U_k \leq \gamma_u \quad (13)$$

to the minimization problem such that for a constraint horizon of length $N_{cc} \leq N_c$ the control moves are limited to $$0 \leq u_{k+i|k} = u_{k-1|k} + \sum_{j=0}^{i} \Delta u_{k+j|k} \leq V_0 \quad (14)$$

for all $i \in \mathbb{N} \leq N_{cc}$.

In addition, the inductor currents can be limited for overcurrent protection of the IGBT switches and to avoid magnetic saturation of the inductors. This is achieved by stating inequality constraints $M_x \Delta U_k \leq \gamma_x$ on the predicted states such that $$-i_1^{max} \leq i_{1,k+i|k} \leq i_1^{max} \quad (15)$$

holds for $i \in \mathbb{N} \leq N_{cc}$. The input and state constraints are then combined to one set of inequality constraints:

$$M \Delta U_k \leq \gamma \quad (16)$$

with $$M = \begin{bmatrix} M_u \\ M_x \end{bmatrix},$$

$$\gamma = \begin{bmatrix} \gamma_u \\ \gamma_x \end{bmatrix}$$

Figure 5:
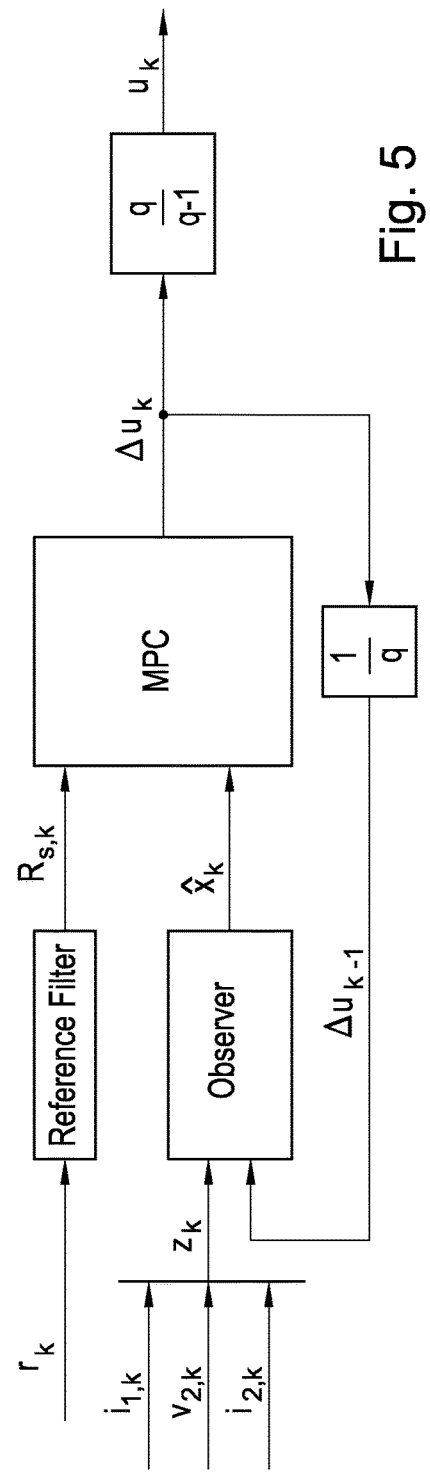
FIG. 5 shows a block diagram of the proposed controller structure.

By implementing the receding horizon principle only the first control move $u_k = u_{k-1} + \Delta u_{k|k}$ is applied at each time instant and the rest of $\Delta U_k$ is discarded. A block diagram of the resulting controller scheme is depicted in FIG. 5.

The controller can be tuned via the weighting matrices Q and $\overline{R}$. With only a single controlled output, Q is assigned an $N_p \times N_p$ unity matrix and $\overline{R}$ is assigned an $N_c \times N_c$ diagonal matrix such that $\overline{R} = diag([R\ R\ \ldots\ R]^T)$. This simplifies the tuning to choosing a single scalar value R. Smaller values of R increase the bandwidth of the closed loop but also increase the sensitivity to measurement noise and plant-model mismatches.

In the following the advantages of using a real-time constrained MPC with regard to the present invention is explained. An illustration in FIG. 6 of the proposed algorithm applied to receding horizon control shows how the predictions evolve over time. The upper row shows predicted output voltage trajectories and the bottom row shows corresponding control variable sequences. The columns represent subsequent time samples. The control moves are not just cut off to fit between the constraints but also the unconstrained moves are modified. Over time the solution gets more and more refined.

The challenge in control of power electronics with constrained MPC is to solve the minimization problem fast enough in order to achieve sampling rates in the kHz-range. Here we propose a simple yet effective algorithm that exploits the structure of the given problem.

If the system had no constraints, then the optimal control sequence $\Delta U_k^0$ is found by minimization of (9) with respect to $\Delta U_k$:

$$\Delta U_k^0 = (\Phi^T Q_y \Phi + \overline{R})^{-1} \Phi^T Q_y (R_{s,k} - F x_k) \quad (17)$$

For constraints in the form of (13), each row $m_j$ of M and the corresponding element $\gamma_j$ of $\gamma$ express one constraint. Any combination of active constraints is expressed as an active set $M_{act}$, $\gamma_{act}$. With the Hessian matrix H (18) and the vector of Lagrange multipliers $\lambda_{act}$ (19):

$$H = 2(\Phi^T Q_y \Phi + \overline{R}) \quad (18)$$

$$\lambda_{act} = -(M_{act} H^{-1} M_{act}^T)^{-1} (\gamma_{act} - M_{act} \Delta U^0), \quad (19)$$

the constrained solution $\Delta U_k$ is found by updating the unconstrained solution to $$\Delta U_k = \Delta U_k^0 - H^{-1} M_{act}^T \lambda_{act} \quad (20)$$

The remaining task is to find the active set that minimizes $J_k$. Active set methods usually require many iterations of adding and removing constraints until the optimal solution is found. In the worst case, all possible combinations of constraints have to be tested. Thus it is not possible to find a polynomial upper bound for the number of iterations with active set methods [H. J. Ferreau, H. G. Bock, and M. Diehl, "An online active set strategy to overcome the limitations of explicit mpc," Int. J. Robust Nonlinear Control, vol. 18, no. 8, pp. 816-830, 2008]. Testing all possible active sets is avoided by (i) exploiting the problem structure to eliminate irrelevant combinations of constraints and (ii) stopping after a limited number of iterations and applying a non-optimal solution as in [H. J. Ferreau, H. G. Bock, and M. Diehl, "An online active set strategy to overcome the limitations of explicit mpc," Int. J. Robust Nonlinear Control, vol. 18, no. 8, pp. 816-830, 2008] and [Y. Wang and S. Boyd, "Fast model predictive control using online optimization," Control Systems Technology, IEEE Transactions on, vol. 18, no. 2, pp. 267-278, 2010].

A heuristic approach that is applicable to the specific problem at hand is as follows. (i) Find the constraint with maximum violation. Any element $\delta_j > 0$ of the vector $\delta = (M \Delta U_k - \gamma)$ indicates a constraint violation. In the case of several simultaneous violations, the largest element $\delta_i$ with $$i = \max_j (m_j^T \Delta U_k - \gamma_j) \quad (21)$$

can be taken as an indicator for the maximum violation, under the condition that all constraints are equally scaled. (ii) Add $\{m_i^T, \gamma_i\}$ to the active set and (iii) re-compute (19), (20). (iv) Repeat for a maximum of $N_{cc}$ iterations, as long as constraints are violated. Constraints are only added but never removed from the active set. This procedure is summarized in Algorithm 1.

Figure 6:
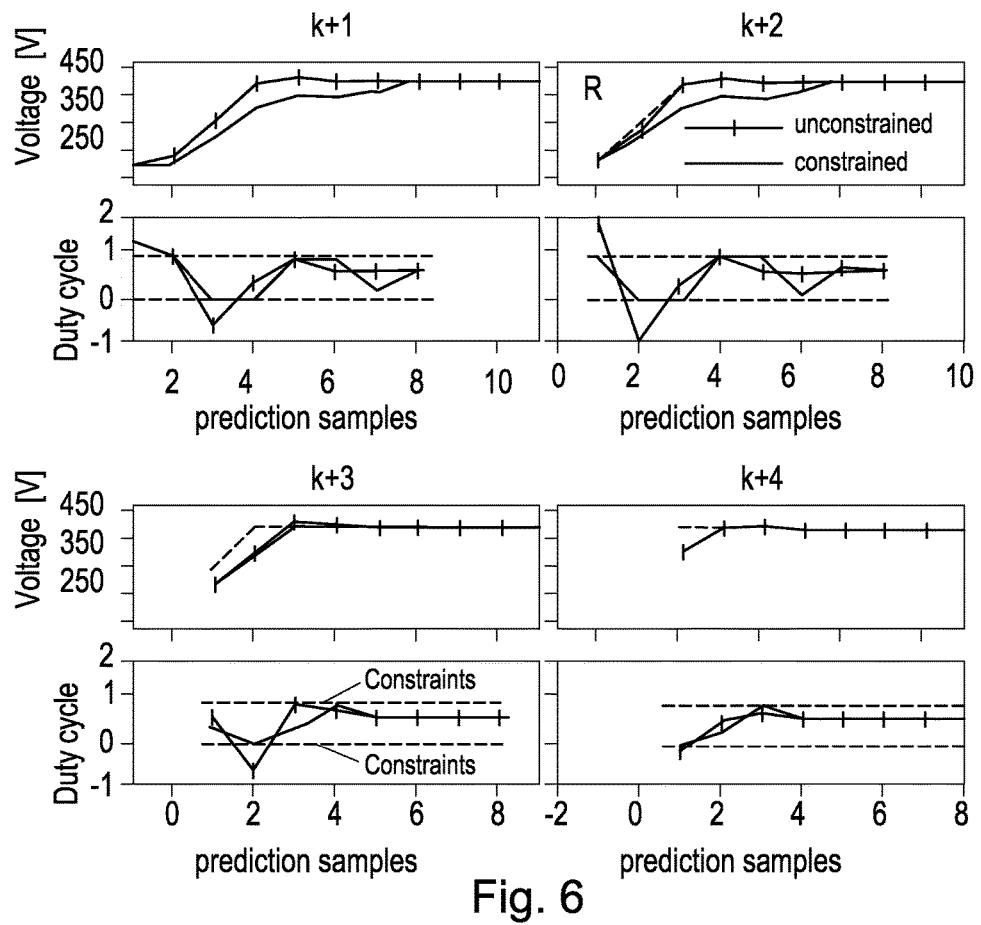
FIG. 6 is an illustration of the proposed algorithm applied to receding horizon control, where the upper row shows predicted output voltage trajectories and the bottom row shows corresponding control variable sequences, while the columns represent subsequent time samples.
Figure 7:
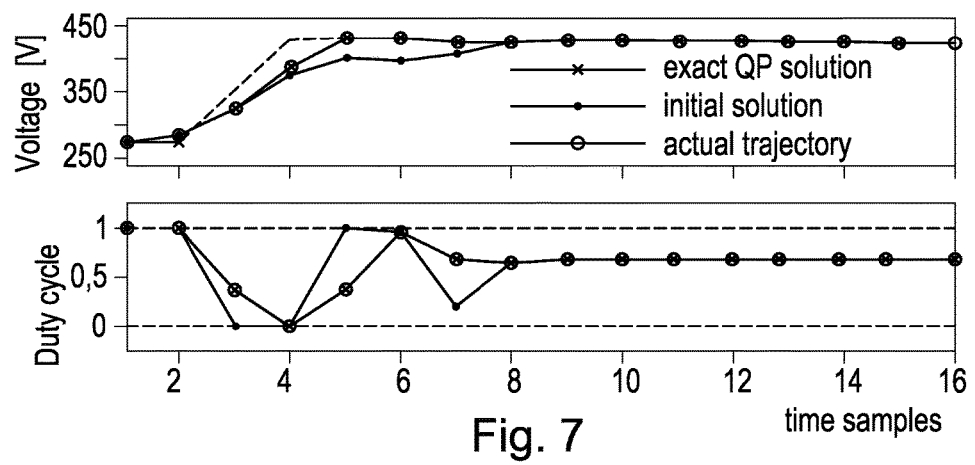
FIG. 7 shows a comparison of the proposed algorithm with an MPC using a generic QP solver.

If only input constraints are considered, then the obtained solution is feasible but not necessarily optimal. Because of the receding horizon control, only the first control move of $\Delta U_k$ is applied. So it is not necessary to find the full solution but only one that approximates $$M = \begin{bmatrix} M_u \kappa_u \\ M_x \kappa_x \end{bmatrix}, \gamma \begin{bmatrix} \gamma_u \kappa_u \\ \gamma_x \kappa_x \end{bmatrix} \quad (22)$$

$$\kappa_u = 1/(u^{max} - u^{min}) \quad (23)$$

$$\kappa_x = 1/(y_x^{max} - y_x^{min}) \quad (24)$$

the first move of the optimal sequence close enough such that the desired trajectory can be achieved. The simulated example in FIG. 6 illustrates how the solutions evolve over time for $N_p=16$, $N_c=8$, $N_{cc}=5$. FIG. 7 shows that the resulting trajectory is virtually identical to the exact solution obtained from quadratic programming, [The Mathworks Inc., "Optimization toolbox 4.3," 2009].

The comparison of the proposed algorithm with an MPC using a generic QP solver in FIG. 7 shows that there is almost no difference between the two trajectories, although the initial solution at time sample 1 is far from optimal.

In order to be also able to handle state constraints at the same time, it is necessary to scale the rows of M and γ such that the elements of δ, i.e. the amount of constraint violation, are comparable. This is achieved by normalizing the input constraints and state constraints to their respective admissible range.

---

Algorithm 1 Active set method with early stopping

1: Initialize with empty active set.
2: Compute unconstrained solution (17).
3: for $N_{cc}$ iterations do
4:   if all constraints are satisfied then
5:     Stop.
6:   else
7:     Find maximum violation $\delta_i$ from (21).
8:     Add constraint $\{m_i^T, \gamma_i\}$ to active set.
9:     Compute solution for active set with (19), (20).
10:  end if
11: end for

---

Because the proposed algorithm does not exactly solve the QP, the resulting control law may cause brief violations of the inductor current limit while saturating the control variable for optimal reference tracking. Therefore it may be necessary to give precedence to the state constraints by scaling them with a precedence factor α.

$$\kappa_x = \alpha/(y_x^{max} - y_x^{min}), \alpha > 1 \quad (25)$$

Simulations show that a value of α=10 gives good results for the application at hand.

With the addition of state constraints, infeasible combinations of constraints can occur. In such a case, the iteration is stopped and the solution from the last iteration is applied. The big advantage of the proposed approach is that it only requires a small and bounded number of iterations, which facilitates a real-time implementation. A similar approach is described in [Y. Wang and S. Boyd, "Fast model predictive control using online optimization," *Control Systems Technology, IEEE Transactions on*, vol. 18, no. 2, pp. 267-278, 2010] where extensive numerical experiments show that a surprisingly good control law can be achieved by stopping after a few iterations. The computation time can be reduced by precomputing the inverse of the Hessian H and by using a rank-1-update for the matrix inversion in (19). A further reduction of the average computation time can be achieved by stopping the algorithm as soon as the first control variable increment is fixed by an equality constraint.

The effects and advantages of a state observer and reference filtering are explained now. Offset free tracking is possible with the chosen MPC formulation, despite plant-model mismatches or unmeasured disturbances. In [U. Maeder, F. Borrelli, and M. Morari, "Linear offset-free model predictive control," *Automatica*, vol. 45, no. 10, pp. 2214-2222, 2009] it is shown that this is achieved by using an observer such that the current state vector contains an estimate $\hat{u}_{k-1}$ instead of the actual previous controller output $u_{k-1}$. Furthermore, the observer can provide the full state vector even if not all states can be measured directly. A reference prefilter is used to generate a feasible reference trajectory vector $R_{s,k}=[r_{s,k,1} \ldots r_{s,k,N_p}]$ from the scalar reference $r_k$ at every sample. The filter delays the trajectory two samples in order to account for the computation delay and the system's low pass characteristic. It also limits the trajectory's rate of change to $|r_{s,k,i} - r_{s,k,i-1}| \leq \Delta r_s^{max}$.

Figure 8:
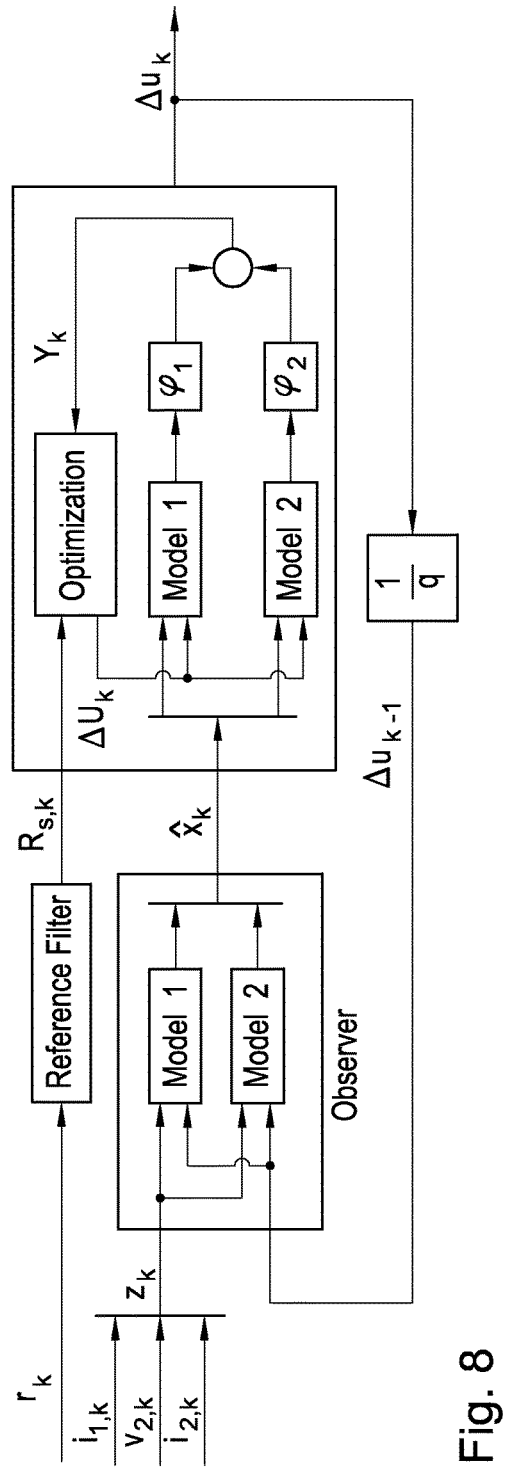
FIG. 8 is a block diagram of the robust controller concept.

The linear MPC described so far only applies to loads with constant parameters. The load's filter capacitance is known or can be measured and does not change during operation. However, with a CPL, the parameter $R_2$ changes over $v_2$ and P according to (2). As one possible approach, a robustness concept is chosen to solve this control problem. For the system model (6), two extremal cases can be identified. First, for P=0, the uncertain parameter becomes $g_P^{max}=0$. Second, for the highest power demand $P^{max}$ at the lowest input voltage $v_2^{min}$ specified for the load inverter, the uncertain parameter takes the value $g_P^{min}=-P^{max}/(v_2^{min})^2$. For the two extremal cases, one can set up two prediction models in the form of (7), which are denoted by $\{A_d(0), B_d(0), C_d(0)\}$ with the state vector $x_{d1k}$ and $\{A_d(g_P^{min}), B_d(g_P^{min}), C_d(g_P^{min})\}$ with the state vector $x_{d2k}$. The basic idea is to use both models for the prediction in order to find a sequence of control moves that properly controls the actual plant on the one hand and stabilizes both extremal plants on the other hand. This is achieved by applying the same control variable sequence to both models and by taking the sum of both outputs weighted with $\varphi_1$ and $\varphi_2$ as the controlled output as shown in FIG. 8.

This can be implemented by using the MPC algorithm from above sections and appropriately setting up the augmented model:

$$x_{k+1} = \begin{bmatrix} A_d(0) & 0 & B_d(0) \\ 0 & A_d(g_P^{min}) & B_d(g_P^{min}) \\ 0 & 0 & 1 \end{bmatrix} x_k + \begin{bmatrix} 0 \\ 0 \\ 1 \end{bmatrix} \Delta u_k \quad (26)$$

$$y_k = [\varphi_1 C_d^y \quad \varphi_2 C_d^y \quad 0] x_k$$

With the state vector chosen as $x_k = [x_{d1k}^T \; x_{d2k}^T \; u_{k-1}]^T$. The observer design requires both models to be observable via an extended output vector:

$$\tilde{z}_k = \begin{bmatrix} C_d(0) & 0 & 0 \\ 0 & C_d(g_P^{min}) & 0 \end{bmatrix} x_k \quad (27)$$

In practice there are only measurements $z_k^T$ from the real plant available. These have to be stacked such that $\tilde{z}_k = [z_k^T \; z_k^T]^T$ in order to obtain the full output vector for the observer.

If the previously unknown parameter $g_P$ can be measured or estimated, then the performance can be improved with a scheduling controller. The system description (7) has one single parameter $g_P$, which is chosen as the scheduling variable. For a representative set of values $$g_P^{min} \leq g_{P,j} \leq g_P^{max}, \forall i \in \mathbb{N} \leq N_g \quad (28)$$

that uniformly span the expected operating range, local MPC parameterizations are obtained.

The corresponding parameter sets $\{\Phi_i, H_i, F_i\}$ are computed offline. At runtime, a scheduler then only has to select the parameter set for which $$i = \min_j |g_{P,j} - g_P|.$$

Figure 9:
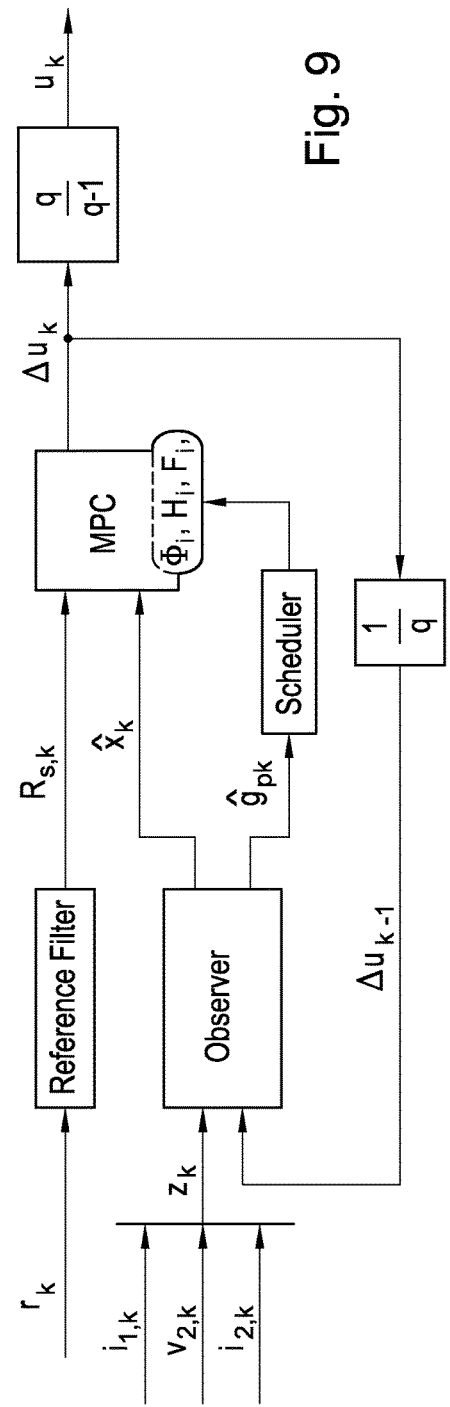
FIG. 9 shows a block diagram of the scheduling controller.

This controller scheme is depicted in FIG. 9. The higher the number $N_g$ of local parameter sets, the smoother the system response will be. The number of parameter sets only has an impact on the amount of memory necessary for parameter storage but does not increase the complexity of online computations. Care has to be taken when implementing this scheme in order to achieve bumpless transfer between the parameter sets. The initial system (7) contains the combined disturbance and offset state $w_k = i_{2,k}^0 - v_{2,k}^0 g_P$ such that the meaning of the state vector depends on the scheduling variable. The same physical state would result in a different value of $w_k$ for each local MPC. This problem is mitigated by choosing an extended discrete time model $$\tilde{x}_{dk+1} = \tilde{A}_d(g_P) \cdot \tilde{x}_{dk} + \tilde{B}_d(g_P) \cdot u_k \quad y_k = \tilde{C}_d^y \cdot x_{dk} \quad (29)$$

with the state vector $$\tilde{x}_{dk} = [i_{1,k} \ v_{2,k} \ i_{2,k}^0 \ v_{2,k}^0]^T \quad (30)$$

for which the relation between the state variables and the physical state is independent of the scheduling variable. Then the augmented prediction model for the MPG is defined as $$\tilde{x}_{k+1} = \underbrace{\begin{bmatrix} \tilde{A}_d(g_P) & \tilde{B}_d(g_P) \\ 0 & 1 \end{bmatrix}}_{A(g_P)} \tilde{x}_k + \underbrace{\begin{bmatrix} 0 \\ 1 \end{bmatrix}}_{B} \Delta u_k \quad (31)$$

$$y_k = \underbrace{[\tilde{C}_d^y \ 0]}_{C} \tilde{x}_k$$

with the augmented state vector $$\tilde{x}_k = [\tilde{x}_{dk}^T \ u_{k-1}]^T. \quad (32)$$

The matrices $A(g_{P,i})$, $B$, $C$ are used to find the corresponding sets $\{\Phi_i, H_i, F_i\}$ from (12), (18). For each sample of the controller, the states $v_{2,k}$ and $v_{2,k}^0$ are equal. However, within the MPC's prediction horizon, only $v_{2,k+i|k}$ changes whereas $v_{2,k+i|k}^0$ remains constant for all $i \in \mathbb{N} \leq N_p$. Because of the choice of state vector made above, the state can be estimated independently of the parameter $g_P$ such that the same observer can be used for the entire operating range. By choosing $g_P = 0$, the influence of the CPL is treated as a disturbance $w_k = i_{2,k}^0 - v_{2,k}^0 \cdot 0 = i_{2,k}^0$. Hence, the state observer is designed for the nominal model:

$$\hat{x}_{k+1} = \begin{bmatrix} A_d(0) & B_d(0) \\ 0 & 1 \end{bmatrix} \hat{x}_k + B_d(0)\Delta u_k \quad (33)$$

$$z_k = [C_d(0) \ 0]\hat{x}_k,$$

$$\hat{x}_k = \begin{bmatrix} \hat{x}_{dk} \\ \hat{u}_{k-1} \end{bmatrix}$$

The estimated state vector $\hat{x}_k$ is extended with $\hat{v}_{2,k}^0 = C_d^y \hat{x}_{dk}$ such that it can be used for the scheduling MPC:

$$\tilde{x}_k = [\hat{x}_{dk}^T \ \hat{v}_{2,k}^0 \ \hat{u}_{k-1}]^T \quad (34)$$

Because $g_P$ cannot be measured directly, the observer is also used to obtain an estimate $\hat{g}_{Pk}$ of the scheduling variable from (4) such that $$\hat{g}_{Pk} = -\frac{\hat{i}_{2,k}^0}{\hat{v}_{2,k}^0}. \quad (35)$$

The crisp parameter switching can cause unwanted excitation of the system during transients. Limit cycles can occur if the steady state operating point is right in the middle of two supporting points and the scheduler constantly switches between them. More advanced scheduling techniques such as parameter blending or controller output blending could bring an improvement in performance [G. Gregorcic and G. Lightbody, "Nonlinear model-based control of highly nonlinear processes," *Computers & Chemical Engineering*, vol. 34, no. 8, pp. 1268-1281, 2010].

The proposed controller designs according to the present invention have been verified with simulations as well as experimentally with a 60 kW battery emulator. The parameters of the test system are listed in table 1. The PWM modulator of the test system had a low-pass filter at its input, which had to be added to the converter model (1).

TABLE 1

System parameters

| parameter | nominal value | description |
| --- | --- | --- |
| $C_0$ | 20 000 µF | DC-link capacitance |
| $U_0$ | 620 V | DC-link voltage |
| $L_1$ | ⅓ · 1800 µH | lumped storage inductance |
| $R_1$ | ⅓ · 8 mΩ | lumped inductor resistance |
| $C_1$ | 450 µF | filter capacitance |
| $C_2$ | 20 000 µF | load input capacitance |
| $f_{sw}$ | 2.5 kHz | switching frequency |
| $f_s$ | 7.5 kHz | sampling rate |

The simulations were carried out using a detailed model of the BE output stage with three interleaved switching phases. The simulated load was modeled as an ideal CPL for voltages greater than 150 V. For lower voltages the simulated load switches to constant current behavior.

In the simulation model, $C_2 = 0$ µF was chosen for the filter capacitance in order to show the effectiveness of the proposed approaches even in worst-case situations. Simulations were carried out using an MPC without CPL model, the proposed scheduling controller and the proposed robust controller. The robust controller was designed for a maximum power demand of $P^{max} = 60$ kW at $v_2^{min} = 245$ V such that $g_P^{max} = 0$ and $g_P^{min} = -1\Omega^{-1}$. Choosing a wider range would lead to increased robustness but also to a slower response. With the scheduling approach, a wider parameter range can be covered without affecting the closed loop performance. Only the increased memory demand for additional parameter sets has to be considered. With the notation of $g_P = 1/R_2$, the system matrices depend linearly on $g_P$.

Consequently, 21 parameter sets were uniformly placed between $g_P^{max}=0$ and $g_P^{min}=-4\Omega^{-1}$ such that the resulting local controllers are placed $0.05\Omega^{-1}$ apart.

Figure 10:
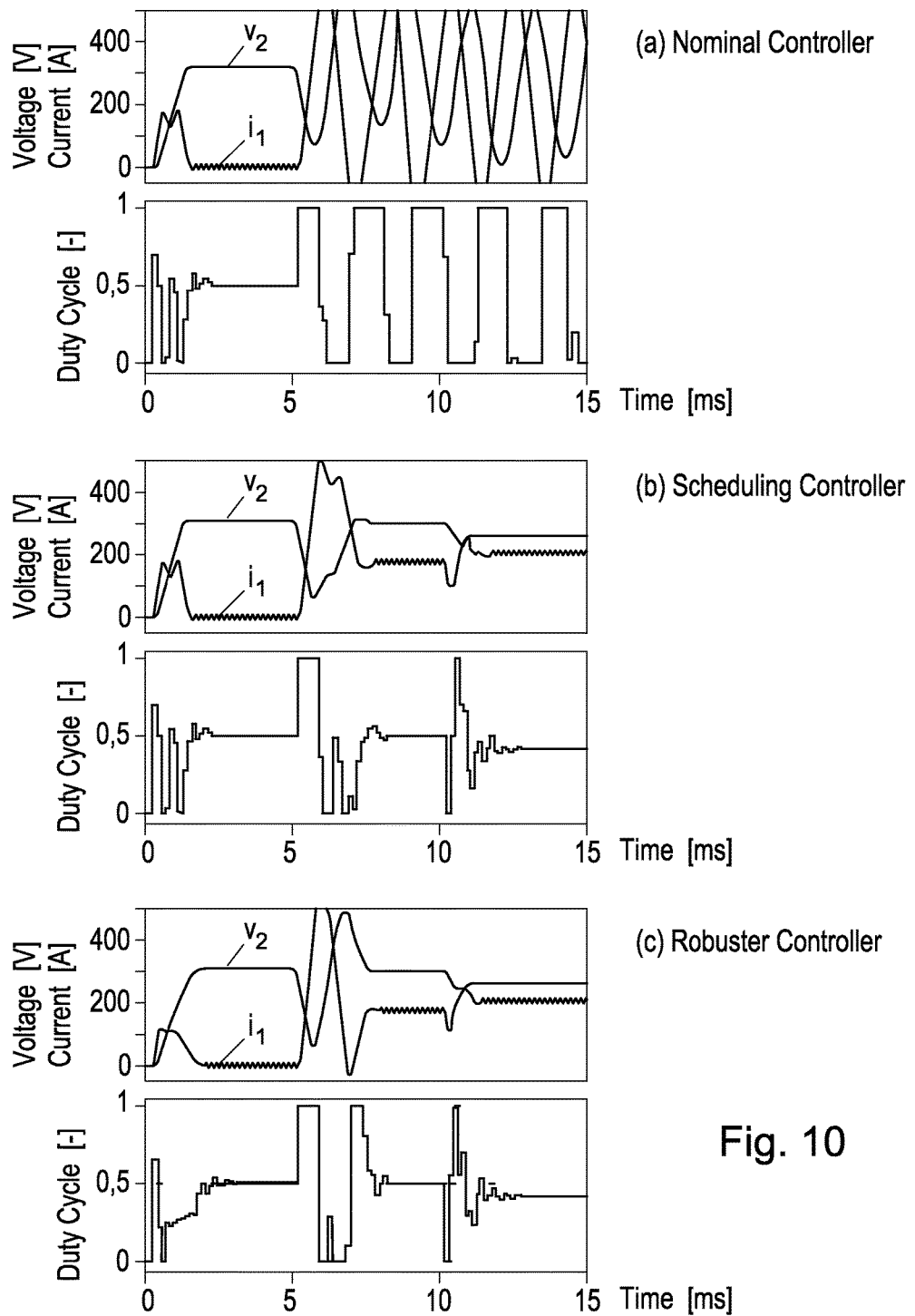
FIG. 10 shows the simulation results for load power step changes from 0 kW to 60 kW with a constant power load, the plots on the top showing output voltage, inductor current and load current. The plots on the bottom show the applied duty cycle.

FIG. 10 shows simulation results for startup without load from 0 V to a set point of 320 V and a sudden load step from 0 kW to 60 kW while the reference is kept constant. At zero load, both the nominal controller and the scheduling controller use the same set of parameters such that their startup is identical for the first 5 ms. After the load step at 5 ms, the nominal controller does not adapt to the changed plant dynamics and the closed loop becomes unstable, whereas the scheduling controller remains stable. Despite a first large dip in the output voltage, the controller is able to quickly restore the voltage with virtually no overshoot by optimally using the available control variable range. With the robust controller variant the closed loop also remains stable but it causes an overshoot and it takes longer to settle after the step disturbance, Because the robust controller uses the control variable more cautiously, it also takes slightly longer to reach the set point during the start up. After 10 ms, a reference step from 320 V to 270 V is applied in order to demonstrate reference tracking and the ability to handle changes in the operating point. Both proposed controllers show similar behavior with a short rise-time and fast settling.

Figure 11:
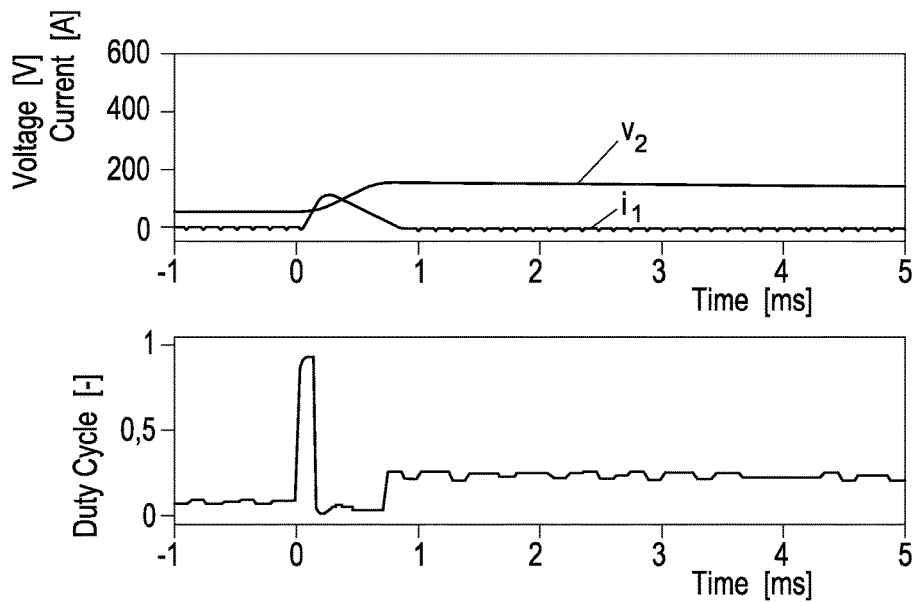
FIG. 11 shows experimental results for reference step changes without a load connected to the battery emulator.
Figure 11:
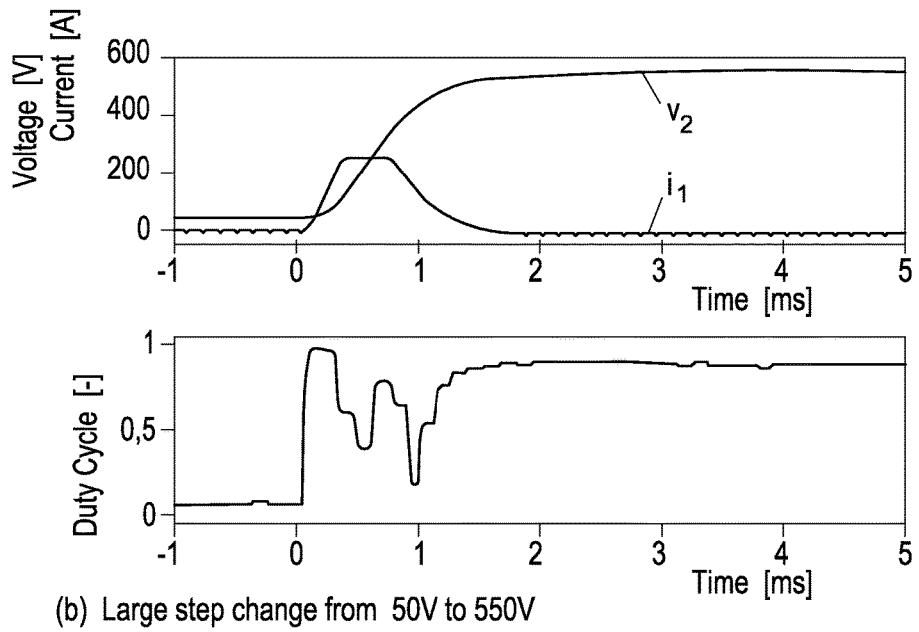

For the experimental tests, the control algorithms have been implemented on a dSpace MicroAutoBox using embedded Matlab for automatic code generation. The dSpace platform features an IBM PPC 750FX processor clocked at 800 MHz. Reference voltage step changes without load are shown in FIG. 11, demonstrating the effectiveness of the constrained optimization. For a small reference step, the set point can be reached very quickly. The controller applies a large control variable increment in the first time step but immediately reduces the control variable to its lower bound for the following samples. After less than 0.8 ms, the set point is reached and the duty cycle is set to its new steady state value. As can be seen, the inductor current follows a triangular trajectory. For a large reference step, the controller fully utilizes the upper bound of the duty cycle during the first two samples. Then the controller follows the optimal reference trajectory until the new set point is reached.

Figure 12:
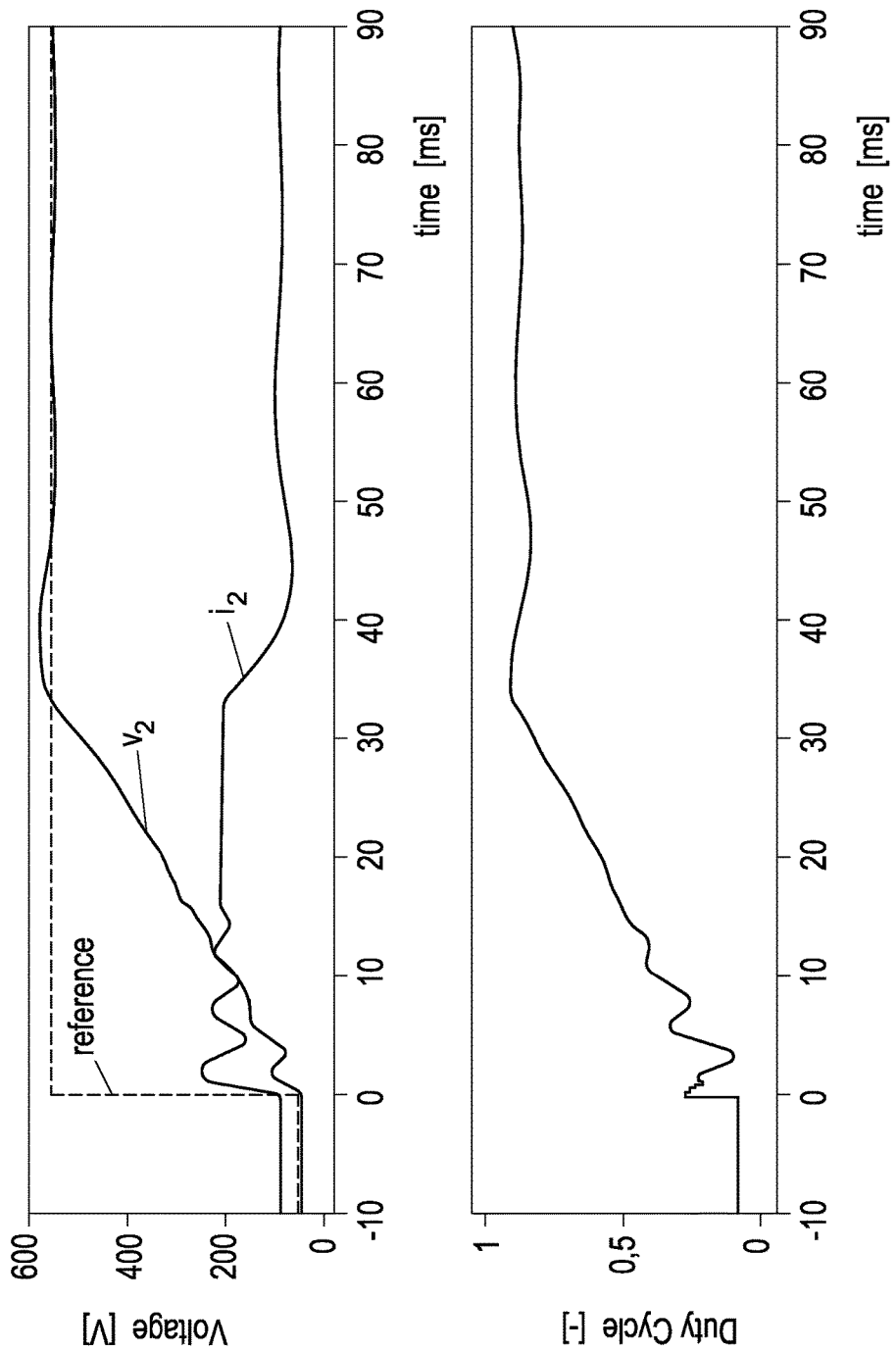
FIG. 12 is a diagram of experimental results for a reference step change showing the effectiveness of the inductor current limiting.

The same large reference step was repeated with a reduced inductor current limit of ±200 A and a constant current load drawing 100 A as shown in FIG. 12 to demonstrate the activation of the inductor current constraint. The inductor current is limited to its upper bound during the transient such that the output voltage can only rise slowly.

Figure 13:
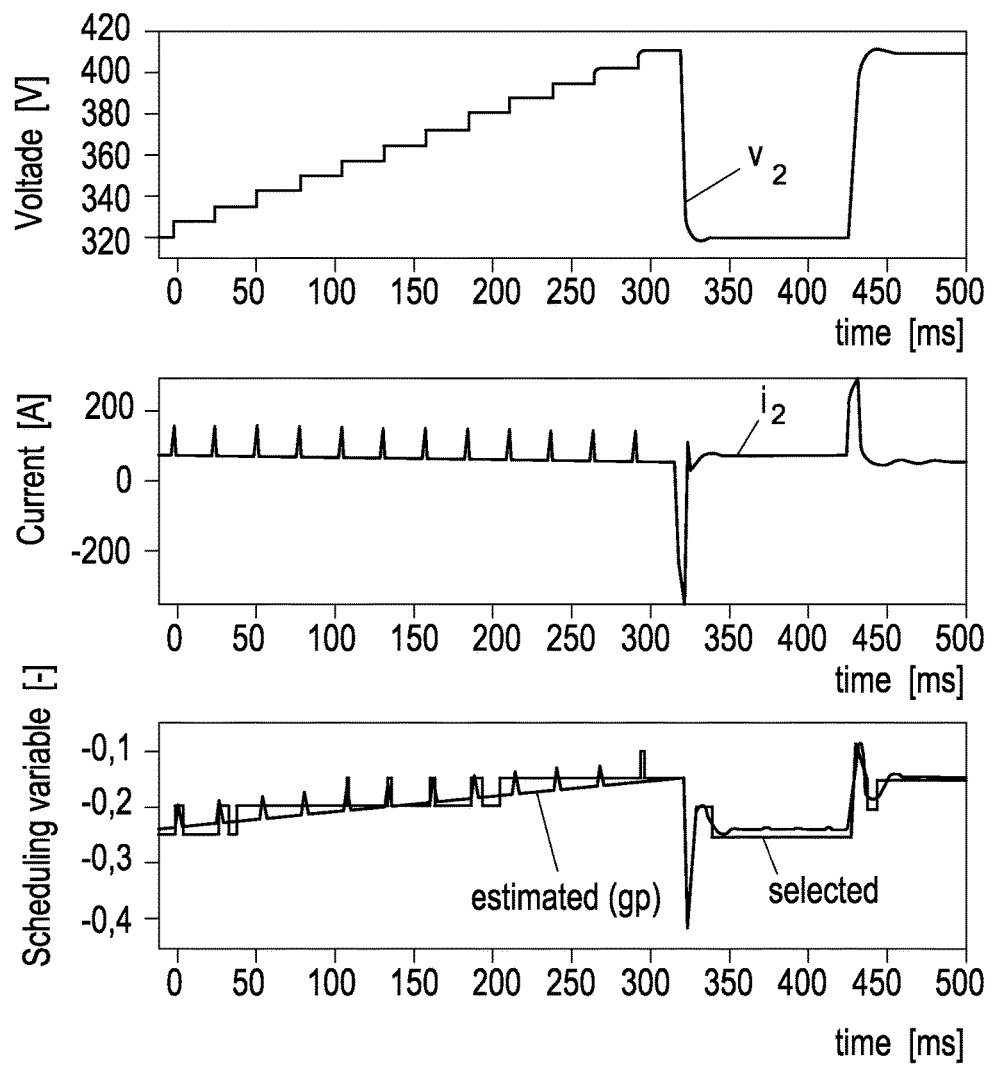
FIG. 13 shows experimental results for a sequence of reference step changes with a constant power load, with the plots at the bottom showing the scheduling variable for the scheduling controller and the duty cycle for the robust controller.
Figure 13:
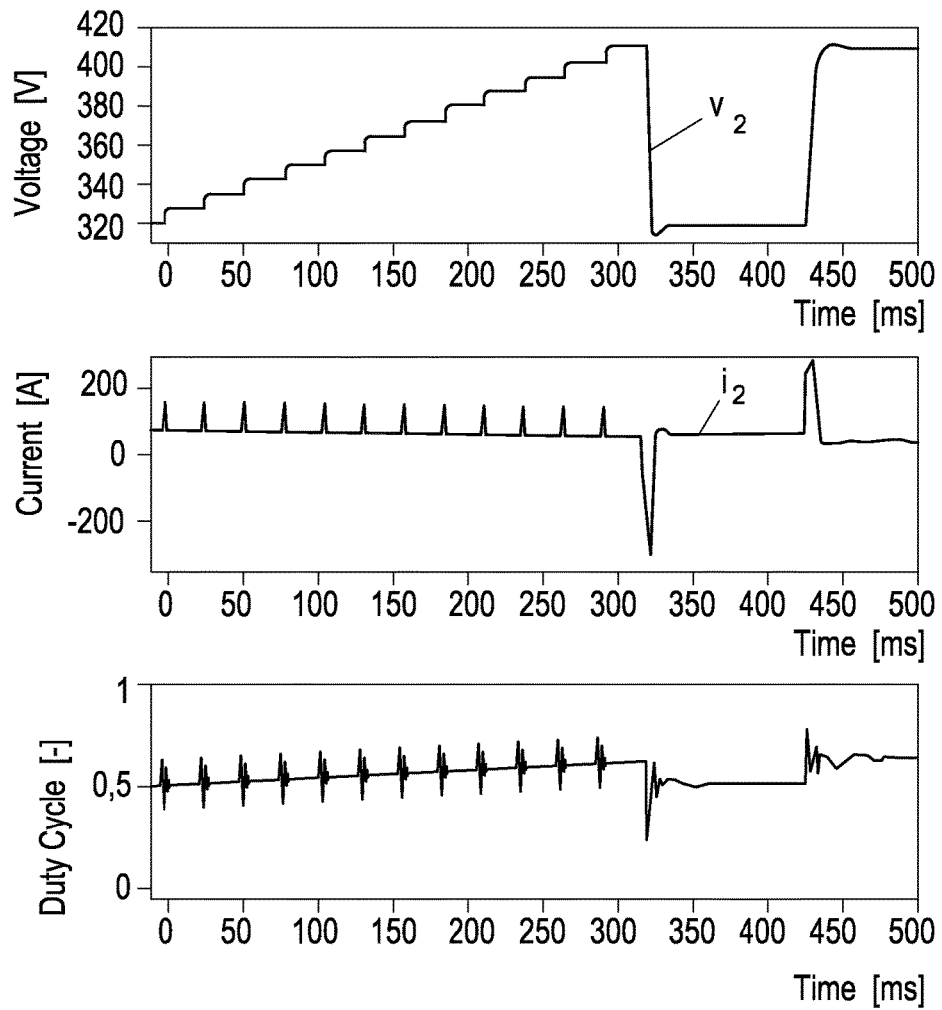

For testing purposes, a DC to three-phase AC UPS inverter with a maximum power of 24 kW and DC link capacitance of $C_2$=20 000 μF was connected to the BE. On the AC side it was set to regulate a constant voltage across a three-phase resistor such that it appeared as a CPL towards the BE. Results for a sequence of reference step changes are shown in FIG. 13, using the scheduling controller and the robust controller. It can be seen that the load current decreases for increasing output voltage and vice versa as it is expected for a CPL. During the transients, the charging and discharging of the inverter's large DC-link capacitor caused large current spikes. But these were limited to the inductor current constraint of ±300 A. Only the scheduling controller slightly violates the lower limit for a short instant.

Figure 14:
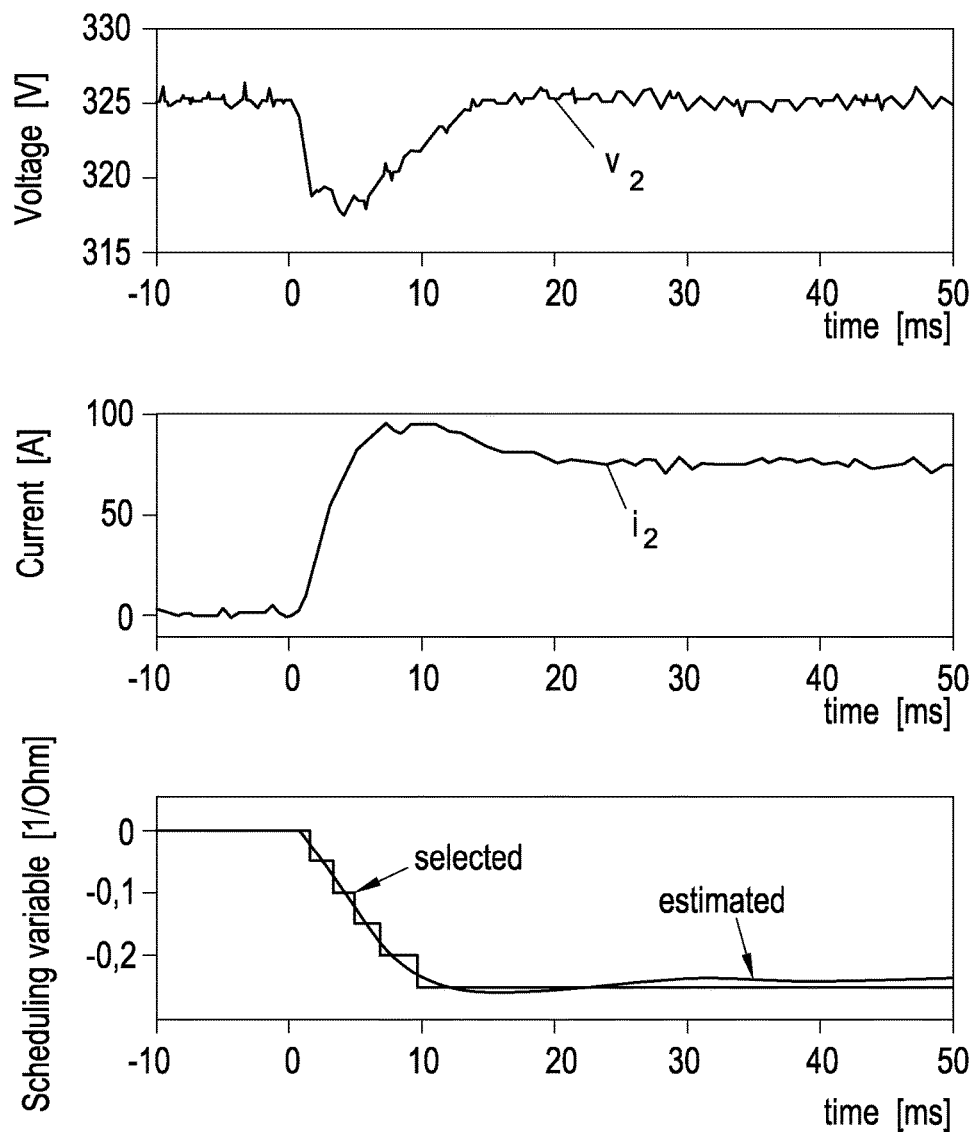
FIG. 14 depicts experimental results for load power step changes with a constant power load from P=0 kW to P=24 kW.
Figure 14:
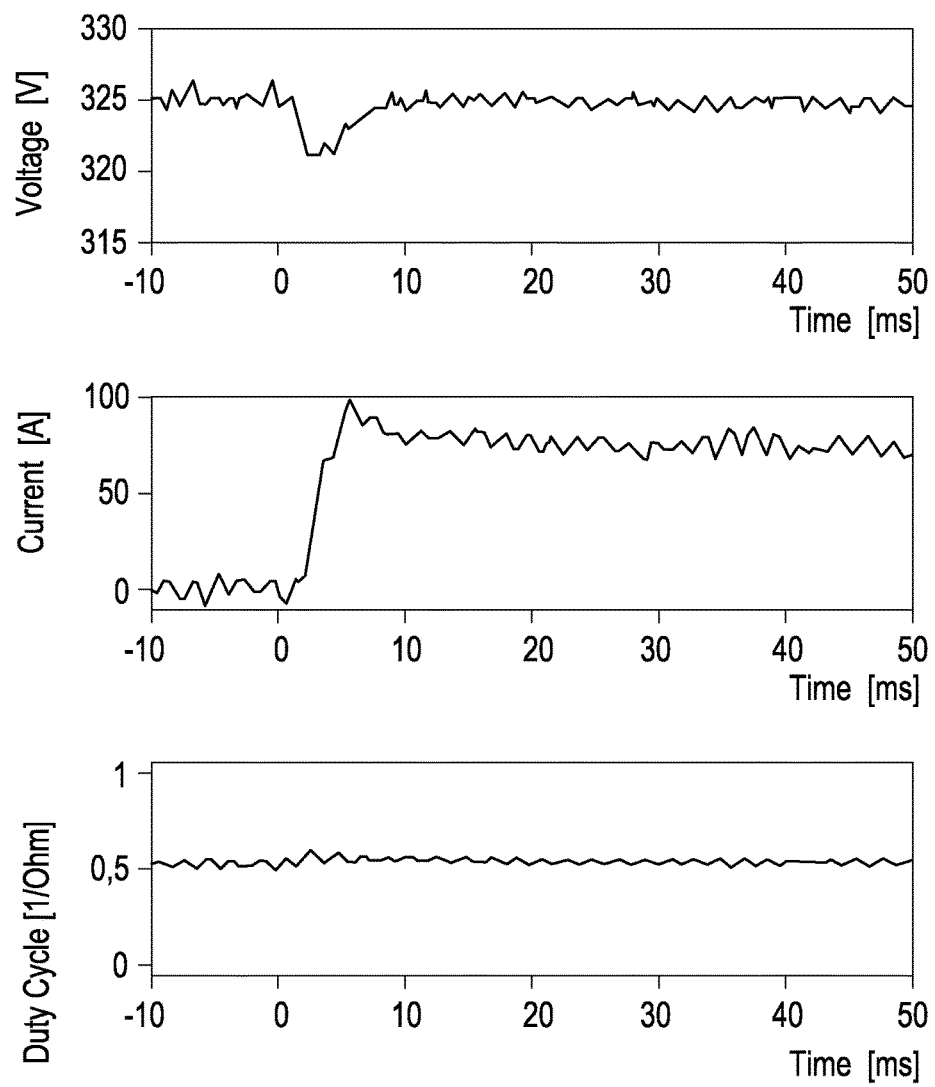

Load disturbances were tested by abruptly switching on the resistors on the AC side of the load inverter. The results are shown in FIG. 14.

The invention claimed is:

1. A method for testing a powertrain of vehicles that are at least in part electrically driven, comprising:
    controlling a voltage supplied to the powertrain by a controller coupled with a simulation system for an energy storage system in a manner that the voltage acts dynamically as for a real energy storage system, wherein the controller is designed with a model based controller design method as model predictive control;
    using a load model of the powertrain in a discrete time model of a controlled system, wherein the model of the controlled system has a parameter set with a parameter ($g_P$) that is variable over an operating range of the controlled system;
    determining at each time instant (k) an optimal sequence of control moves ($\Delta u_k$);
    calculating a number (i) of parameter sets with a different parameter ($g_{P,i}$) over the operating range and choosing a parameter set with parameter ($g_{P,i}$) which is closest to the actual parameter ($g_P$); and
    determining the sequence of control moves ($\Delta u_k$) with the chosen parameter set.

2. The method according to claim 1, wherein the voltage is measured, the method further comprising estimating a load power demand of the powertrain and modifying the parameter set of the model of the controller system in dependence of the voltage and the estimated load power demand, by switching between complete parameter sets.

3. The method according to claim 2, wherein the estimation of the load power demand is accomplished with an observer system, based on a measured load current.

4. A device for testing of a powertrain of vehicles that are at least in part electrically driven, comprising:
    a simulation system for an energy storage system, and
    a controller that is coupled with the simulation system;
    wherein the controller controls a voltage supplied to the powertrain in a manner that said voltage acts dynamically as for a real energy storage system;
    wherein a model based controller as a model predictive control is realized for a controlled system, and a load model of the powertrain is integrated in a model of the controlled system and at each time instant (k) an optimal sequence of control moves ($\Delta u_k$) is determined by the model predictive control;
    wherein the model of the controlled system has a parameter set with a parameter ($g_P$) that is variable over an operating range of the controlled system; and
    wherein the model predictive control chooses a parameter set with parameter ($g_{P,i}$) which is closest to the actual parameter ($g_P$) from a number (i) of calculated and over the operating range allocated parameter sets with different parameter ($g_{P,i}$) for determining the sequence of control moves ($\Delta u_k$).

5. The device according to claim 4, wherein a load power demand dependent model is integrated into the model of the controlled system.

6. The device according to claim 5, wherein the load model of the powertrain is integrated into the model of the controlled system that depends on an output voltage of the energy storage system.

7. The device according to claim 4, wherein a model for the model predictive control comprises a converter model including a constant power load with an input filter capacitance.

8. The device according to claim 7, wherein the converter model is based on a linearized negative impedance approximation of the constant power load which depends on an output voltage and a power demand of a load of the powertrain.

9. A device for testing of a powertrain of vehicles that are at least in part electrically driven, comprising:
- a simulation system for simulating an energy storage system; and
- a controller that is coupled with the simulation system, for controlling a voltage supplied to the powertrain in a manner that said voltage acts dynamically as for a real energy storage system;
- wherein the controller is designed as a model based controller as a model predictive control for a model of a controlled system that has integrated a load model of the powertrain; and
- wherein the model of the controlled system has a parameter set with a parameter that is variable over an operating range of the controlled system, one or more parameter sets are calculated for different parameters, an actual parameter is determined based on an estimate of a load power demand of the powertrain, and a parameter set closest to the actual parameter is selected from the calculated one or more parameter sets by the model predictive control to determine a next control move.

* * * * *